United States Patent
Lupke et al.

(10) Patent No.: US 11,148,342 B2
(45) Date of Patent: Oct. 19, 2021

(54) AIR PRESSURE CONTROL FOR CORRUGATOR

(71) Applicants: Manfred A. A. Lupke, Thornhill (CA); Stefan A. Lupke, Thornhill (CA)

(72) Inventors: Manfred A. A. Lupke, Thornhill (CA); Stefan A. Lupke, Thornhill (CA)

( * ) Notice: Subject to any disclaimer, the term of this patent is extended or adjusted under 35 U.S.C. 154(b) by 654 days.

(21) Appl. No.: 15/328,310

(22) PCT Filed: Jul. 23, 2015

(86) PCT No.: PCT/CA2015/000440
§ 371 (c)(1),
(2) Date: Jan. 23, 2017

(87) PCT Pub. No.: WO2016/011532
PCT Pub. Date: Jan. 28, 2016

(65) Prior Publication Data
US 2017/0217074 A1    Aug. 3, 2017

(30) Foreign Application Priority Data

Jul. 23, 2014 (CA) ..................... 2857699

(51) Int. Cl.
*B29C 49/00* (2006.01)
*B29C 48/09* (2019.01)
(Continued)

(52) U.S. Cl.
CPC .......... *B29C 49/0021* (2013.01); *B29C 33/36* (2013.01); *B29C 43/226* (2013.01);
(Continued)

(58) Field of Classification Search
CPC .............. B29C 49/0021; B29C 49/783; B29C 47/0023; B29C 47/0054; B29C 47/065;
(Continued)

(56) References Cited

U.S. PATENT DOCUMENTS 3,996,323 A * 12/1976 Hegler ................ B29C 49/0021
264/508
4,901,552 A * 2/1990 Ginty ................... B21D 26/055
29/421.1
(Continued)

FOREIGN PATENT DOCUMENTS

CA     2404772 A1    9/2002
CA     2450560 C     5/2005
(Continued)

OTHER PUBLICATIONS

ISA/CA, International Search Report and Written Opinion of PCT/CA2015/000440, dated Oct. 28, 2015.
(Continued)

*Primary Examiner* — Jacob T Minskey
*Assistant Examiner* — Caroline Montiel
(74) *Attorney, Agent, or Firm* — Cahn & Samuels, LLP (57) ABSTRACT

In the manufacture of double-walled corrugated extruded pipe it is desirable to form an integral connecting cuff that is of a single wall thickness and typically of a large diameter. The mold blocks and process parameters for forming of the cuff as part of an otherwise double-walled pipe requires a transition as the cuff moves past the die outlets. The present invention allows for accurate sensing and control of air pressure and temperature as the cuff moves past the die outlets. Improvements in both the die tooling and the method of manufacture are disclosed.

16 Claims, 10 Drawing Sheets

(51) Int. Cl.

| | |
|---|---|
| *B29C 48/13* | (2019.01) |
| *B29C 48/00* | (2019.01) |
| *B29C 33/36* | (2006.01) |
| *B29C 48/30* | (2019.01) |
| *B29C 43/22* | (2006.01) |
| *B29C 48/92* | (2019.01) |
| *B29C 49/78* | (2006.01) |
| *B29L 23/00* | (2006.01) |
| *B29C 43/58* | (2006.01) |
| *B29C 48/21* | (2019.01) |
| *B29C 55/24* | (2006.01) |
| *B29K 23/00* | (2006.01) |

(52) U.S. Cl.
CPC .......... *B29C 48/0017* (2019.02); *B29C 48/09* (2019.02); *B29C 48/13* (2019.02); *B29C 48/21* (2019.02); *B29C 48/303* (2019.02); *B29C 48/92* (2019.02); *B29C 49/783* (2013.01); *B29C 55/24* (2013.01); *B29C 2043/5808* (2013.01); *B29C 2043/5816* (2013.01); *B29C 2948/92019* (2019.02); *B29C 2948/92209* (2019.02); *B29C 2948/92514* (2019.02); *B29C 2948/92904* (2019.02); *B29C 2948/92971* (2019.02); *B29C 2949/78025* (2013.01); *B29C 2949/78537* (2013.01); *B29K 2023/06* (2013.01); *B29K 2023/12* (2013.01); *B29L 2023/22* (2013.01)

(58) Field of Classification Search
CPC ..... B29C 43/226; B29C 47/92; B29C 47/126; B29C 55/24; B29C 47/0033; B29C 33/36; B29C 2949/78025; B29C 2949/78537; B29C 2043/5808; B29C 2947/92209; B29C 2647/92904; B29C 2947/92514; B29C 2647/92019; B29C 2647/92971; B29C 48/901; B29C 48/902; B29C 48/903; B29C 48/904; B29C 48/92; B29C 48/92019; B29C 48/337; B29C 48/335; B29C 48/338; B29C 48/00; B29C 48/0015; B29C 48/0016; B29K 2023/06; B26K 2043/58; B29L 2023/22
USPC .................................. 425/133.1, 326.1, 336
See application file for complete search history.

(56) References Cited

U.S. PATENT DOCUMENTS

| | | | |
|---|---|---|---|
| 5,320,797 A | 6/1994 | Hegler | |
| 5,405,569 A | 4/1995 | Lupke | |
| 6,155,813 A | 12/2000 | Lupke et al. | |
| 6,458,311 B1* | 10/2002 | Hegler | B29C 49/0021 264/508 |
| 8,579,624 B2 | 11/2013 | Sutton et al. | |
| 2004/0131716 A1 | 7/2004 | Neubauer | |
| 2004/0232579 A1* | 11/2004 | Lupke | B29C 49/783 264/40.3 |
| 2008/0029506 A1* | 2/2008 | Neal | B29C 45/1704 219/628 |

FOREIGN PATENT DOCUMENTS

| | | |
|---|---|---|
| CN | 1419493 A | 5/2003 |
| DE | 10110064 A1 | 9/2002 |
| JP | H06-15713 A | 1/1994 |
| JP | 2000127220 A | 5/2000 |
| JP | 2004-519354 A | 7/2004 |
| JP | 2007512157 A | 5/2007 |
| WO | 2005049302 A1 | 6/2005 |

OTHER PUBLICATIONS

ISA/CA, International Preliminary Report on Patentability of PCT/CA2015/000440, dated Jan. 24, 2017.
English translation of Office Action dated Sep. 3, 2020 issued in respect of corresponding Chinese Application No. 201580040925.1.
Industrial Property Cooperation Center, Search Report by Registered Search Organization in Japanese Pat. App. No. 2017-524070, dated May 27, 2019, pp. 1-11.
Japanese Patent Office, Notification of Reasons for Rejection in Pat. App. No. 2017-524070, dated Jun. 28, 2019, pp. 1-4.
Japanese Patent Office, Notification of Reasons for Rejection in Pat. App. No. 2017-524070, dated Jun. 30, 2020, pp. 1-3.
Japanese Patent Office, Decision to Grant in Pat. App. No. 2017-524070, dated Jan. 6, 2021, pp. 1-3.
Canadian Intellectual Property Office, Examination Report in Pat. App. No. 2,857,699, dated Apr. 11, 2018, pp. 1-4.
European Patent Office, Communication pursuant to Article 94(3) EPC in EP App. No. 15 824 640.5, dated Sep. 24, 2020, pp. 1-7.
European Patent Office, Communication pursuant to Rule 62 EPC in EP App. No. 15 824 6405, Feb. 23, 2018, pp. 1-10.

* cited by examiner

AIR PRESSURE CONTROL FOR CORRUGATOR

FIELD OF THE INVENTION

The present invention relates to systems and methods for forming corrugated pipe and in particular for forming double walled corrugated pipe having connecting cuffs.

BACKGROUND OF THE INVENTION

Corrugated pipe is commonly manufactured as a continuous process with the corrugated pipe having elongate corrugated sections that are separated at pre-determined intervals by an integral cuff that allows pipe sections to be connected in an end to end manner. These cuff sections downstream of the corrugator are typically cut to separate the pipe sections from each other. The cuff sections are of a greater cross section and are designed to sleeve over the corrugations of the pipe. Different sealing arrangements can be provided.

A pipe corrugator cooperates with die tooling which extrudes one or more envelopes of plastic that form the walls of the pipe. It is common to have an air pressure outlet associated with the die outlets of the tooling to assist in displacing the extruded plastic envelope outwardly and to have it engage and be drawn into the corrugations of the mold block. The amount of air pressure provided is a function of the diameter of the pipe, the thickness of the walls, the extrusion temperature and other factors. An operator will adjust the air pressure to provide satisfactory results.

The physical configuration of the mold blocks for forming the cuff significantly changes the air pressure required to force the plastic outwardly. The cuff cavity in the mold blocks defines a fairly large volume and if the air pressure used to form corrugations was maintained, the extruding plastic envelope would effectively balloon in an upstream direction and not provide a smooth displacement of the plastic envelope into the cavity of the mold block defining the cuff. It is known to sense the position of the secondary mold blocks that define the cuff and to reduce the air pressure for forming the cuff. Typically there is an air pressure regulator provided outside of the die tooling that provides processed air at the desired pressure to bias the plastic envelope into the mold blocks in the desired manner. Additionally the mold blocks include vacuum channels which further act to draw the plastic into conformity with the mold block cavities once there has been some contact with the plastic envelope.

The problem of accurately forming the cuff becomes more acute when the die tooling is designed for forming double walled pipe. In this case there is an outer wall of corrugations formed from a first plastic envelope extruding from a first die outlet and an inner wall of the pipe is formed by a second plastic envelope extruding from a second die outlet downstream from the first die outlet. Processed air is used to blow the first extruded plastic into the corrugations and typically the die tooling includes a cooling plug that biases the plastic of the second die outlet against the corrugations while forming a smooth inner wall of the pipe.

This process works quite well and is consistent when forming the pipe sections of the corrugations and the inner smooth wall. As the mold blocks for forming the pipe cuff start to move first past the first die outlet, and then past the second die outlet, the air pressure urging the first plastic outwardly against the corrugations must be reduced to avoid blowing or ballooning of the plastic envelope effectively upstream as opposed to biasing it into the cuff cavity of the mold blocks. Therefore pressure balance points are necessary where the air pressure is sufficient to bias the extruded plastic envelope outwardly and into the corrugations (a first balance point) or into the pipe cuff (a second balance point) and yet of a sufficiently low pressure to avoid ballooning of the plastic envelope in an upstream direction.

It has been found that improvements can be made with respect to the forming of the pipe cuffs for double walled pipe by accurate measurement of the pressure adjacent the first die outlet and providing feedback to a pressure regulator outside of the die tooling. In addition, a second pressure can be appropriately controlled for assisting the plastic envelope being extruded from the second die outlet to merge into the cuff cavity of the mold blocks without ballooning in an upstream direction.

SUMMARY OF THE INVENTION

The present invention is directed to a pipe corrugator and associated die tooling for forming pipe having elongate pipe sections separated by integral connecting cuffs provided at predetermined locations in the length of the formed pipe. The pipe corrugator includes two opposed series of circulating mold blocks that abut to form an inlet to a mold tunnel and remain in abutment until an exit to the mold tunnel where the mold blocks separate and are returned to the inlet. Each series of mold blocks includes first mold blocks for forming the elongate pipe sections in the mold tunnel and second mold blocks for forming the connecting cuffs in the mold tunnel. The die tooling includes two die outlets located in the mold tunnel adjacent the inlet with the die outlets separated by a process air cavity formed in a recessed portion of an exterior wall of the die tooling open to the mold tunnel and connected to a first process air supply providing air under pressure to a first process air outlet located in the process air cavity. A first air pressure transducer is located in the process air cavity detecting air pressure in the process air cavity, and a second supply of process air supplying process air to a second process air outlet is located immediately downstream of the second die outlet. A controller receives a signal of the air pressure sensed by the first transducer and based thereon provides process air at a first air pressure to the first process air outlet appropriate for forming corrugations when the first mold blocks pass over the first and second die outlets and the controller controls the first process air supply and selectively operates the second process air supply to provide process air at a second air pressure reduced relative to the first air pressure for forming a cuff when the cuff cavity of the second mold blocks pass over the die outlets.

According to an aspect of the invention, the controller receives positional information of the second mold blocks relative to the die outlets and based on the positional information of the second mold blocks determines when a leading wall of the pipe cuff cavity is about to move past the first die outlet and reduces the pressure of the air supply cavity to a the second air pressure. The controller based on the positional information determines when the leading wall of the pipe cuff cavity is about to move past the second die outlet and provides air pressure at a cuff forming pressure generally equal to the second air pressure via the second air supply. The controller maintains the air pressure at the lower cuff forming pressure and the second air pressure until a trailing wall of the pipe cuff cavity passes the second die outlet and then returns the corrugation forming pressure in the process air cavity and removes air supply pressure through the second inlet.

In a further aspect of the invention, a second process air outlet is located immediately downstream of the second die outlet and connects with a second process air supply conduit extending in a length of the die tooling and supplies regulated process air under pressure to the second process air outlet immediately downstream of the second annular die outlet. The controller is connected to a pressure transducer adjacent the second annular die outlet detects an air pressure to the exterior of the die tooling at the second process air outlet.

Die tooling for use in forming double wall corrugated pipe according to the present invention comprises a die tool body having a first annular die outlet and a second annular die outlet located downstream of and separated from the first die outlet by an air processing cavity located in a recess of the die tooling and opening outwardly. The first and second annular die outlets are connected through the die body to extruded plastic inlets. The air processing cavity includes a first process air outlet located in the cavity. The first process air outlet connects with a first process air supply conduit extending in a length of the die tooling and supplies process air under pressure to the first process air outlet.

The air processing cavity includes an air pressure transducer located in the cavity and produces an air pressure signal in accordance with the air pressure of a variable chamber defined between the die tooling including the air processing cavity and plastic extruding through the die outlets and connecting with each other. The air pressure signal is provided to a controller at a position upstream of the first and second annular die outlets.

A regulated air supply controlled by the controller and connected to the first process air supply conduit is used to regulate the air pressure of the variable chamber between at least a corrugation forming pressure and a lower cuff forming pressure.

In an aspect of the invention the die tooling includes a second process air outlet located immediately downstream of the second die outlet and connecting with a second process air supply conduit extending in a length of the die tooling and supplies regulated process air under pressure to the second process air outlet immediately downstream of the second annular die outlet. The controller uses a pressure transducer adjacent the second annular die outlet to detect an air pressure to the exterior of the die tooling at the second process air outlet for regulating the pressure.

In a further aspect of the invention, the controller includes an operator adjustment for varying the corrugation forming pressure and varying the lower cuff forming operating pressure used to form a single wall cuff of the pipe from plastic extruding through both of the die outlets.

In yet a further aspect of the invention, the controller for the second process air outlet includes a minimal operating pressure used during the forming of corrugations connected to an inner smooth wall of a pipe and a higher cuff forming operating pressure for forming a single wall cuff of the pipe from plastic extruding through the die outlets.

In an aspect of the invention, the controller for the second process air outlet includes a minimal operating pressure used during the forming of corrugations connected to an inner smooth wall of a pipe and a higher second operating pressure for forming a single wall cuff of the pipe from plastic extruding through the die outlets and wherein the higher second pressure is generally the same as the lower cuff forming pressure.

A pipe corrugator and associated die tooling for forming pipe having alternating long pipe sections separated by alternating integral connecting cuffs provided at predetermined locations in the length of the formed pipe according to the present invention includes two opposed series of circulating mold blocks that abut to form an inlet to a mold tunnel and remain in abutment until an exit to the mold tunnel where the mold blocks separate and are returned to the inlet. Each series of mold blocks includes first mold blocks for forming the elongate pipe sections in the mold tunnel and second mold blocks having a cuff cavity for forming in the mold tunnel the connecting cuffs. The die tooling includes a die tool body having a first annular die outlet and a second annular die outlet located downstream of and separated from the first die outlet by an air processing cavity located in a recess of the die tooling and opening outwardly. The first and second annular die outlets are connected through the die body to extruded plastic inlets. The air processing cavity includes a first process air outlet located in the cavity, with the first process air outlet connecting with a first process air supply conduit extending in a length of the die tooling and supplying process air under pressure to the first process air outlet. The air processing cavity includes an air pressure transducer located in the cavity and produces an air pressure signal in accordance with the air pressure of a variable chamber defined between the die tooling in an area including the air processing cavity and plastic extruding through the die outlets and connecting with each other. The air pressure signal is provided to a controller at a position upstream of the first and second annular die outlets, and a regulated air supply controlled by the controller and connected to the first process air supply conduit regulates the air pressure of the variable chamber.

In an aspect of the invention, a second process air outlet is located immediately downstream of the second die outlet and connects with a second process air supply conduit extending in a length of the die tooling and supplies regulated process air under pressure to the second process air outlet immediately downstream of the second annular die outlet controlled by the controller using a pressure transducer adjacent the second annular die outlet detecting an air pressure to the exterior of the die tooling at the second process air outlet.

In yet a further aspect of the invention, the controller receives positional information of the second mold blocks relative to the die outlets. The controller, based on the positional information of the second mold blocks, determines when a leading wall of the pipe cuff cavity is about to move past the first die outlet and reduces the pressure of the air supply cavity to the second air pressure.

The controller, based on the positional information determining when the leading wall of the pipe cuff cavity is about to move past the second die outlet, provides air pressure at a cuff forming pressure generally equal to the second air pressure via the second air supply.

The air pressure at the lower cuff forming pressure and the second air pressure is maintained until a trailing wall of the pipe cuff cavity passes the second die outlet and then returns to the corrugation forming pressure in the process air cavity and removes air supply pressure through the second inlet.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
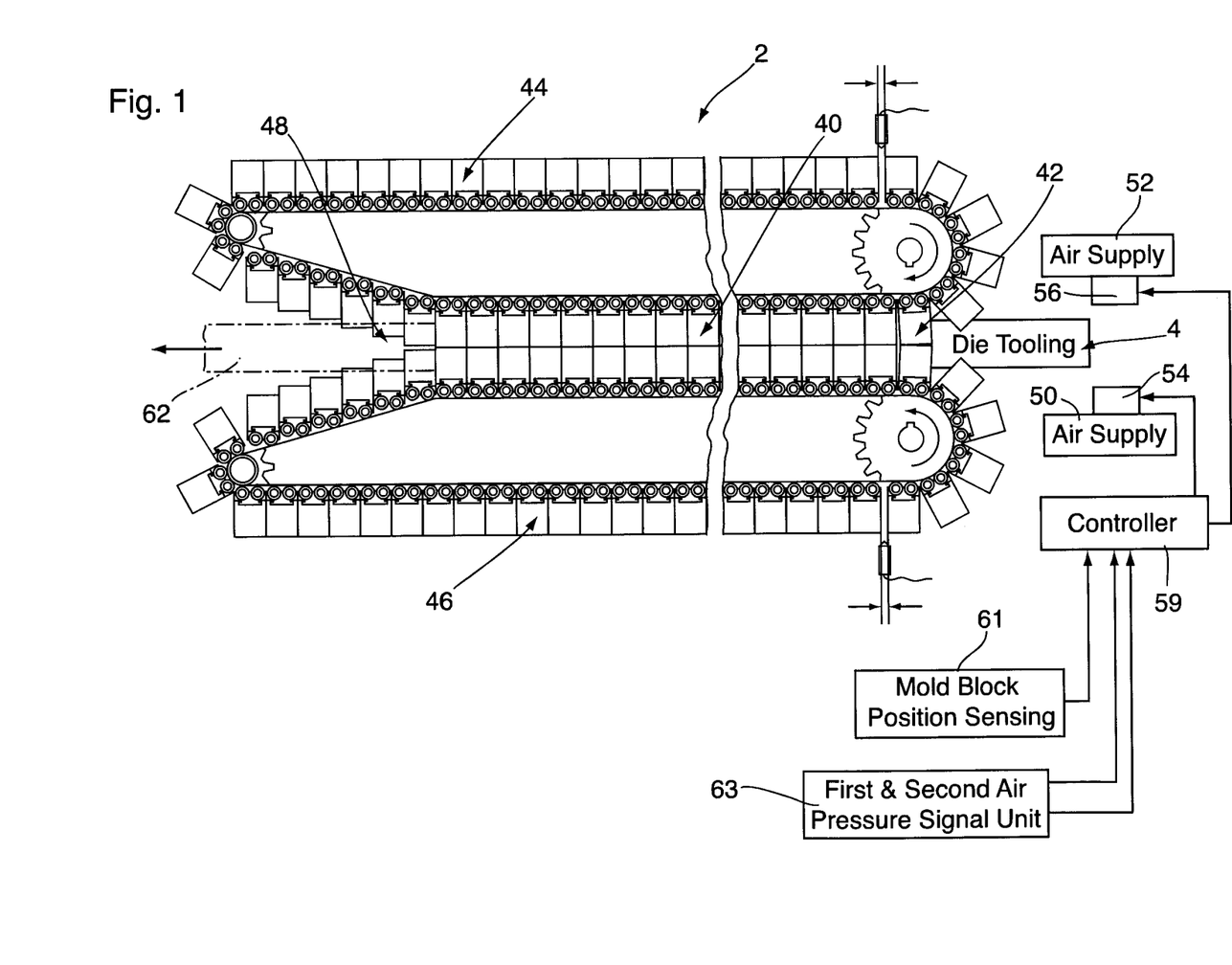
FIG. 1 is a schematic view of a pipe corrugator and die tooling.

The pipe corrugator 2 shown in FIG. 1 includes die tooling 4 positioned adjacent the moving mold tunnel generally shown as 40. The mold tunnel includes an inlet 42 where the two series of mold blocks 44 and 46 come into abutment with each other and the moving mold tunnel has an exit 48 where the first and second mold blocks separate and are returned to the inlet. The die tooling has associated therewith a first air pressure supply source 50 and a second air pressure supply source 52. Each of these include their own regulator 54 and 56 respectively. The pipe corrugator also includes a controller 59. Double walled corrugated pipe 62 is generally shown at the exit to the corrugator.

The controller 59 is connected to mold block positioning sensing unit 61 and first and second air pressure signal unit 63 for receiving air pressure signals detected adjacent plastic extruding outlets of the die tooling 4.

Figure 2:
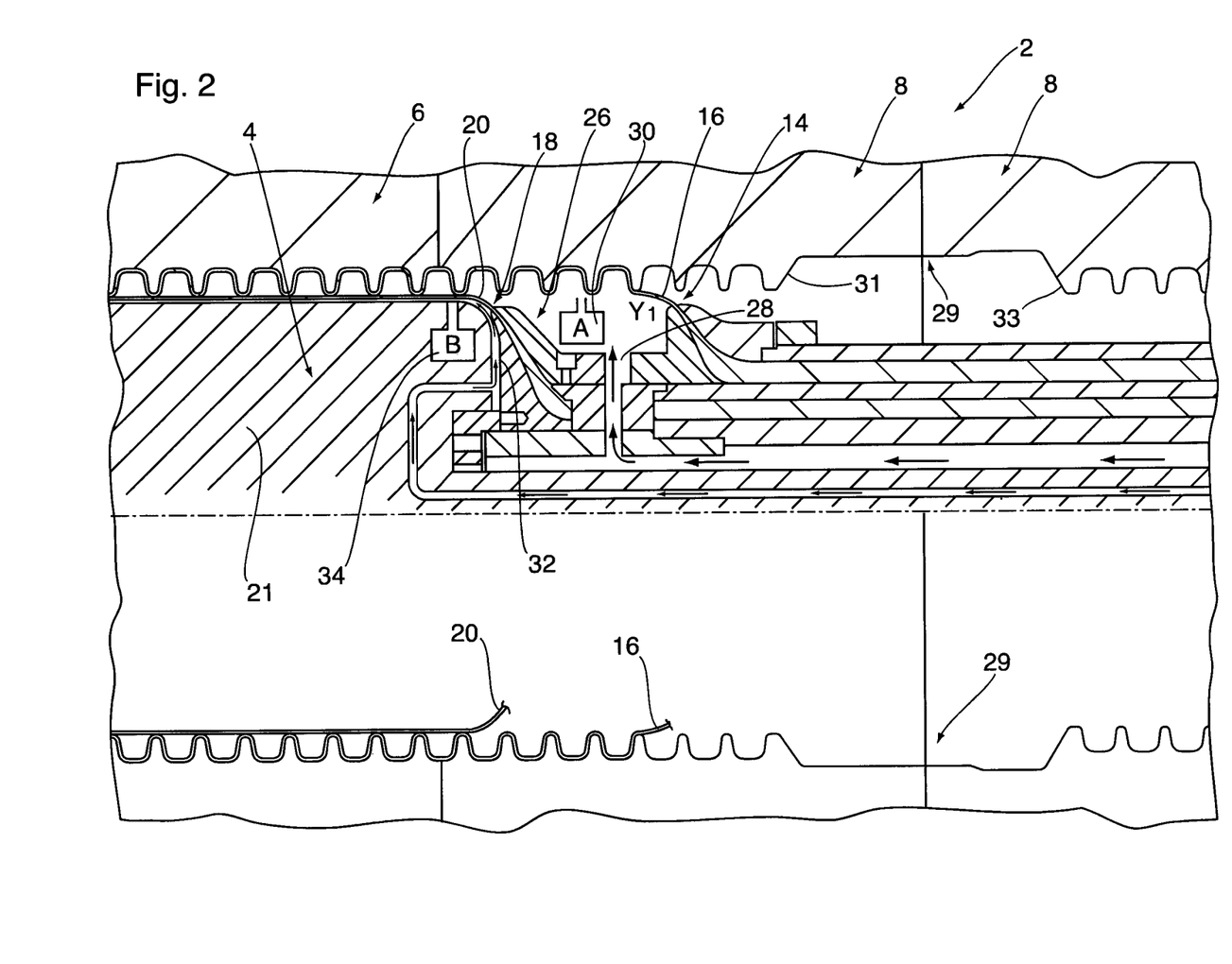
FIG. 2 is a partial sectional view showing details of a corrugator and die tooling for forming double walled corrugated pipe.

In the partial sectional view of FIG. 2, the mold blocks of the moving mold tunnel are moving across a first die outlet 14 that is extruding a first plastic envelope 16 and are moving past a second die outlet 18 extruding a second plastic envelope 20. The first plastic envelope 16 will form the corrugations of the outer wall of the corrugated double walled pipe and the second plastic envelope 20 forms the inner smooth wall of the pipe. A cooling plug 21 is shown downstream of the second die outlet 18 and the cooling plug biases the extruded second plastic envelope 20 into contact with the inner walls of the corrugation thus attaching the inner and outer walls.

It should be understood that FIG. 2 shows first mold blocks 6 which are of the type to form the corrugations of the double walled pipe as well as the inner wall of the corrugated pipe. There will be many of these mold blocks forming long sections of corrugated double walled pipe of this configuration. FIG. 2 also illustrates second mold blocks 8 which cooperate to form a cavity 29 for forming a cuff of the corrugated pipe. It can be seen that the cavity 29 is quite large and is of a cross section similar to the outer walls of the corrugations and perhaps slightly larger. This cuff can be inserted over the corrugations of the pipe to connect one pipe section to the other. Different corrugators allow for either the insertion of mold blocks 8 during the cycling of the mold blocks to form a pipe cuff at a desired location or the corrugator may have a fairly large number of mold blocks and a cuff is formed at predetermined intervals.

In FIG. 2 it can be seen that the die tooling 4 includes a cavity 26 that is open to the interior of the corrugations of the mold block. This open cavity in the die tooling is immediately downstream of the first die outlet 14. During the normal manufacture of a double walled pipe the first plastic envelope is extruded through the first die outlet 14 and is biased (by air pressure) into the corrugations of the mold block to form the corrugated pipe. To encourage the movement of the envelope 16 into the corrugations, air under pressure is introduced through the inlet 28 and provides a bias force displacing the envelope outwardly as it continues to move with the mold blocks. A first pressure transducer 30 monitors the pressure in the open cavity 26 and as will be subsequently described, is used to detect two different pressures. In FIG. 2 a pressure Y1 is shown, which is a higher corrugation forming operating pressure that provides the bias force forcing the first envelope into the corrugations. The second envelope 20 passes out the second die outlet 18 and is brought into contact with the inner walls of the corrugations to form a connection therewith, and the cooling plug 28 biases this inner wall against the corrugations and forms the smooth inner surface of the double walled pipe.

In the forming of double walled corrugated pipe with outer corrugations and a connected inner smooth wall, it is known to adjust the pressure Y1 to achieve the desired results. If this pressure is too great, the first plastic envelope will balloon in an upstream direction past the die inlet and will cause significant problems. If the pressure is too low the first plastic envelope will not be brought into full contact with the corrugation forming cavities of the mold blocks and deficiencies in the formed pipe. The first type mold block 6 as well as the second type mold blocks 8 include vacuum channels which assist in drawing the plastic into contact with the cavities of the mold blocks once the envelope has been generally brought into close proximity with the cavities.

Figure 3:
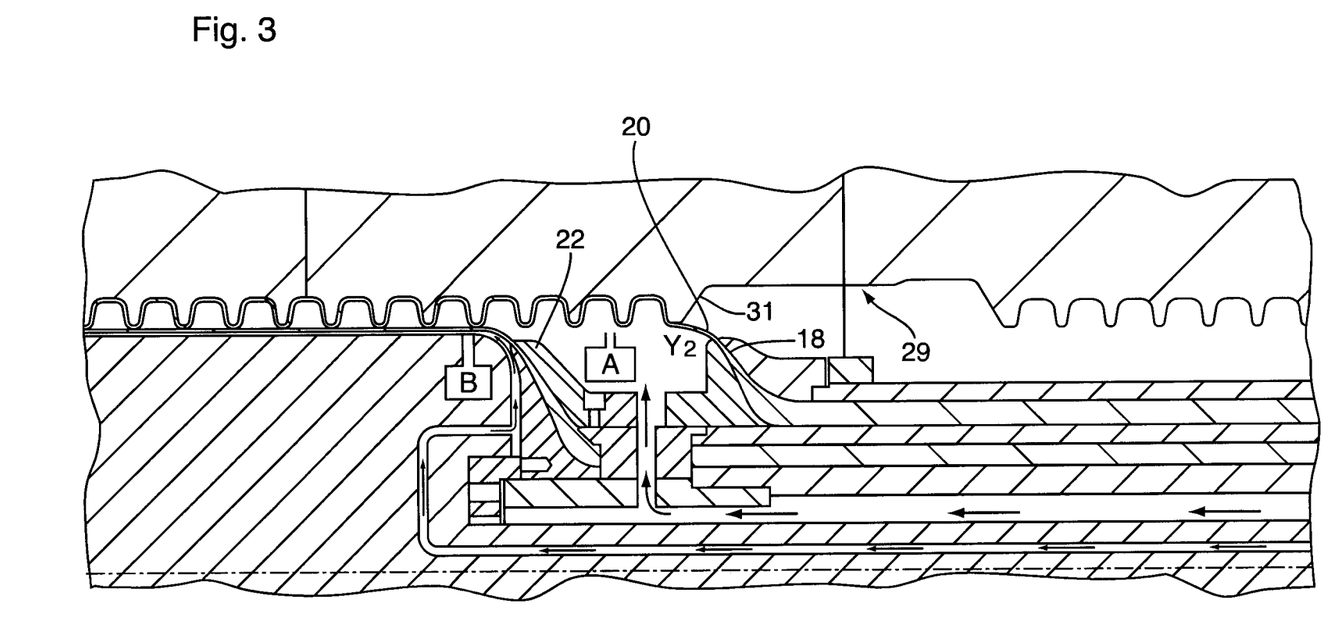
FIG. 3 is a view similar to FIG. 2 with the second mold blocks for forming of a cuff portion partially overlapping with die outlets.

The present invention additionally addresses a further problem that occurs when the second type mold blocks 8 that include the cavity for forming the pipe cuff, move past the die outlets. In particular, there is a requirement to change the pressure as the initial leading wall of the pipe cuff cavity starts to move past the first die outlet 14. This is shown in FIG. 3 where the lead wall 31 of the pipe cuff cavity 29 has moved past the first die outlet 18. The pipe cuff cavity 29 is quite large and there is a large gap now formed between the pipe cavity 29 and the first die outlet 18 through which air can flow in an upstream direction. This large open cavity does not provide any substantial resistance to air flow which would cause the hot extruded plastic envelope 20 ballooning outwardly and upstream. To overcome this tendency the pressure within the open cavity is reduced to a level Y2. This reduced pressure still encourages the first plastic envelope 20 to be displaced outwardly and form the walls of what will be the pipe cuff by being pressed into the shape of the cavity 29 of the mold blocks 8. The second die outlet 22 in FIG. 3 is continuing to form the inner wall of the double walled corrugated pipe and this inner wall is being pressed against previously formed corrugations. The cooling plug 21 continues to force the inner wall against the corrugations.

Figure 4:
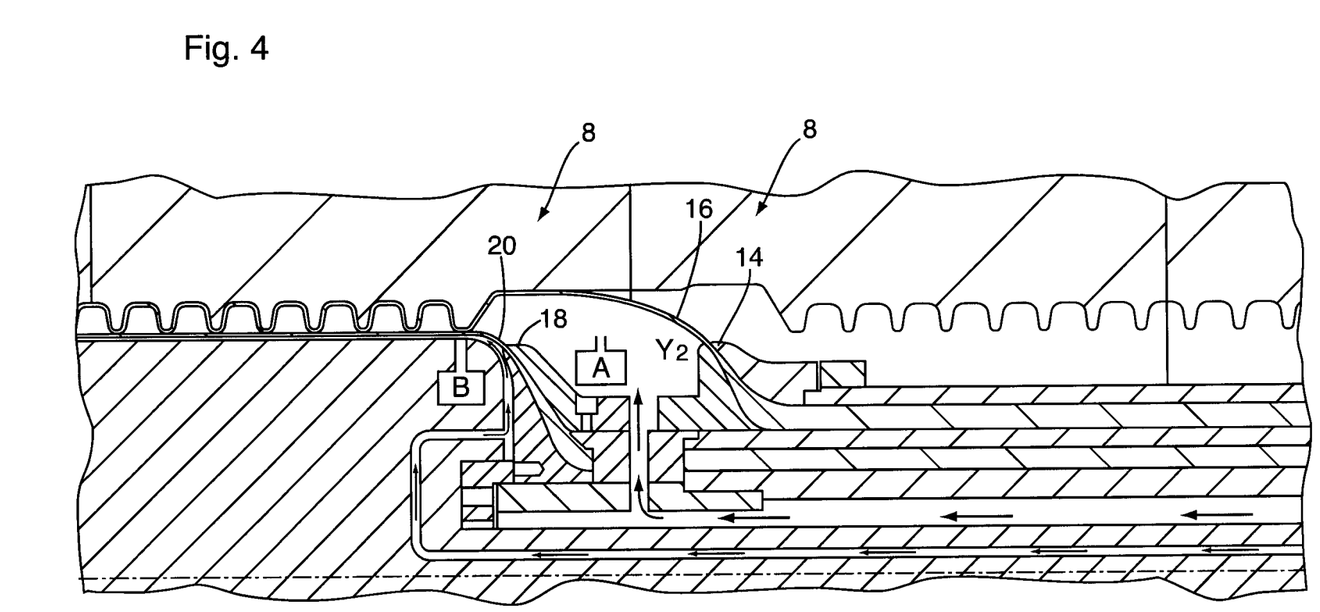
FIG. 4 is a similar view to FIG. 2 with the mold blocks for forming the cuff portion generally centered over the first die outlet.

In FIG. 4 the mold blocks 8 continue to advance past the die outlets. As shown, the die outlet 16 is extruding plastic into the pipe cuff cavity 29. The pressure has been reduced to ensure that the extruded plastic envelope 18 does not balloon in the upstream direction. The pressure is still sufficient to force the extruded plastic envelope 16 out into contact with the mold cavity 29 as the mold blocks move downstream. The second die outlet 20 has just finished forming the inner wall against the last corrugation. Any subsequent movement of the mold blocks of the moving mold tunnel will require that the second plastic envelope 22 will now be displaced outwardly to form part of the pipe cuff.

Figure 5:
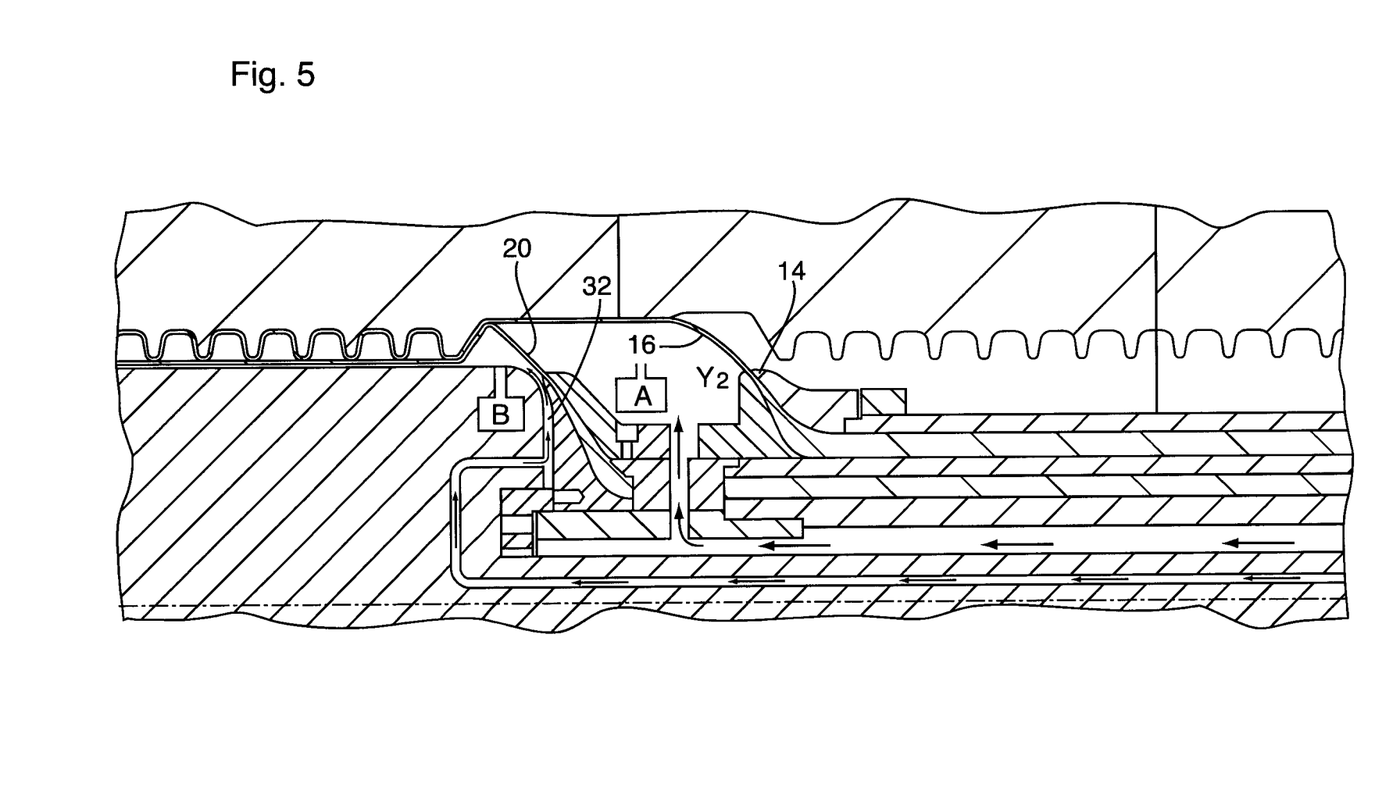
FIG. 5 is a similar view with the mold blocks for forming the cuff portion about to move past the first die outlet.

This aspect can be appreciated from a review of FIG. 5 where the second plastic envelope 22 leaves the die outlet 20 and is displaced outwardly against the cavity 29 forming the pipe cuff. It is generally at this point that additional processed air is provided through the processed air outlet 32 and is generally at a pressure similar or equal to Y2, namely the reduced pressure in the open cavity 26. In this way there is a bias force moving the second plastic envelope outwardly into the deeper cavity for forming the pipe cuff. The generally equal pressures provide the outward bias without undesirable ballooning or collapse of the plastic envelopes.

Figure 6:
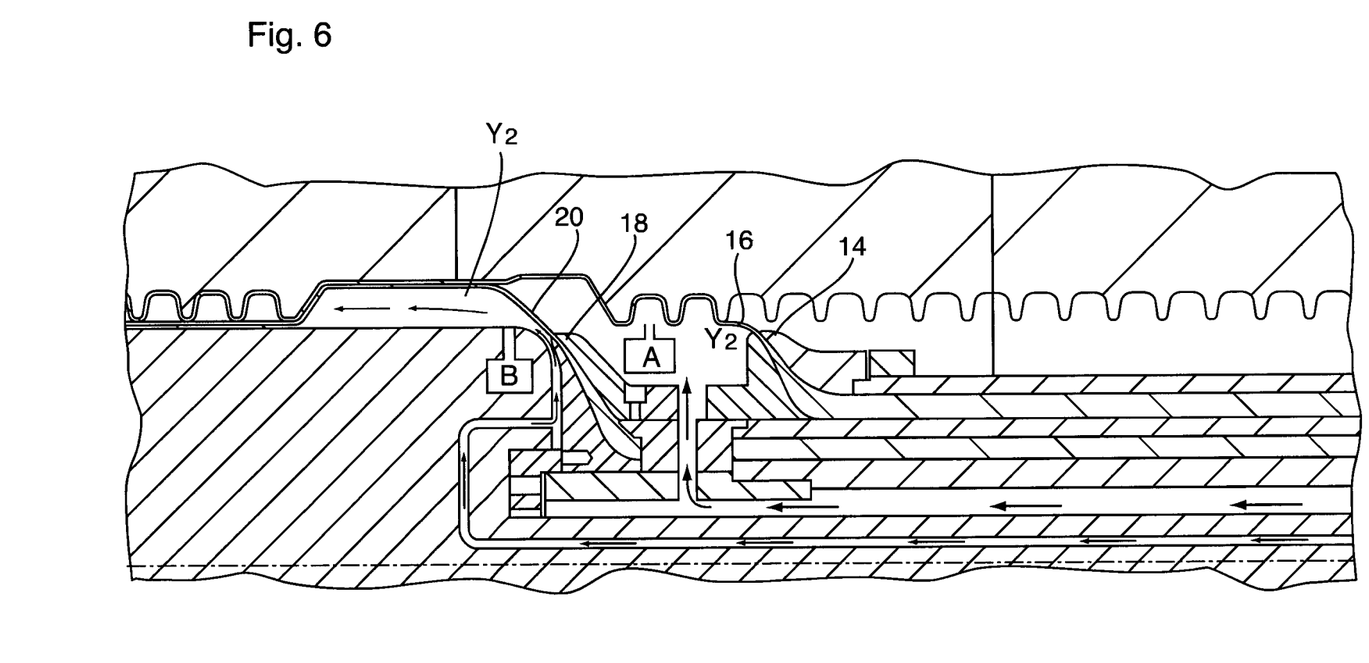
FIG. 6 is a similar view with the trailing portion of the cuff portion approaching the second die outlet while the first die outlet is extruding plastic into corrugations of the mold block.

As can be seen in FIG. 5, the trailing wall 33 of the second mold blocks 8 is about to move past the first die outlet 14. This trailing wall has moved past the first die outlet 14 in the view of FIG. 6 and the first plastic extrudate is now forming the corrugations of the pipe. The pressure within the open cavity 26 is still at a reduced level but at sufficient level to encourage the first plastic extrudate to follow the shape of the corrugations. The cavity 29 of the pipe cuff is now generally over the second die outlet 20 and this cavity is at the reduced pressure Y2 as processed air is being provided thereto. Again there is a balance between the pressure encouraging the first plastic extrudate to form the corrugations and the second plastic extrudate which is presently forming an inner portion of the pipe cuff.

Figure 7:
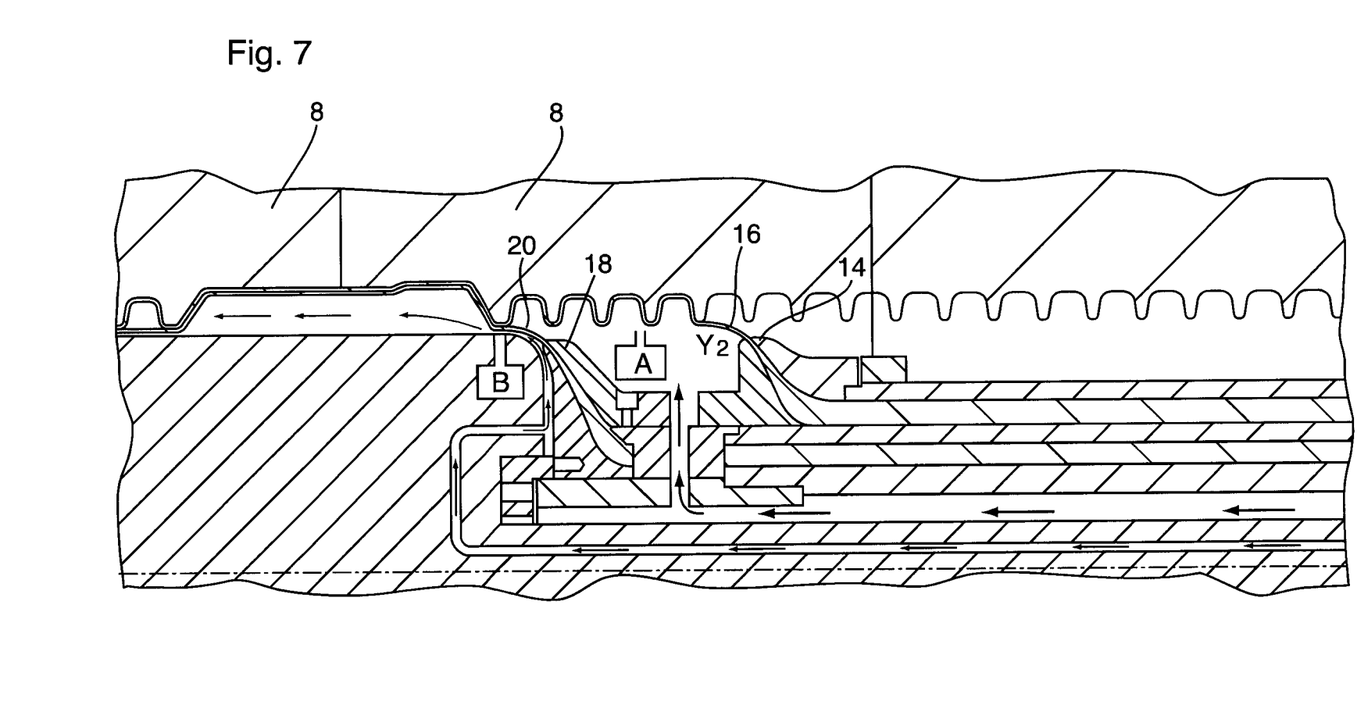
FIG. 7 is a sectional view showing the pipe cuff portion of the mold blocks positioned downstream of the second die outlet.

FIG. 7 shows how the cavity 29 forming the pipe cuff has now moved past the second die outlet 18. At this point the second plastic envelope is returning to form the inner wall of the corrugated pipe sections. The first plastic envelope is forming the corrugations of the pipe. The cavity 29 that forms the pipe cuff has now moved past the inlets and the pressure within the open cavity 26 can now be returned to the higher Y1 pressure. No air pressure is being provided downstream of the second die outlet 20.

It is common to cut the formed pipe at the end of a cuff at two locations to remove a short transition portion from cuff to corrugations.

It has been found that sensing of the pressure via the first pressure transducer 30 located in the open cavity 26 of the die tooling 4 provides improved information and regulation of the pressure between Y1 and Y2 that is important for accurately forming of the pipe cuff. Similarly the second pressure transducer 34 senses air pressure at the second inlet of the cavity forming the pipe cuff as it is moving past the second die outlet 18. It is preferable that each of these pressure transducers has an inlet that is not directly exposed to the flow of processed air or is at least downstream thereof to more accurately sense the pressure in the cavity as opposed to pressure caused by the air flow directly contacting the transducer.

As described in FIGS. 2 through 7, the position of the second mold blocks which form the pipe cuff as they move past the die outlets of the die tooling is important. The position of these mold blocks is tracked by the controller shown in FIG. 1 and the controller 59 can receive the signals from the air pressure transducers to accurately determine the pressure provided to the pipe cuff as it moves past these die outlets. Regulators for each of the air pressure supplies 50 and 52 are provided and are used to provide the desired air pressure at a particular point in time. It can be appreciated from the description above, the air pressure and processed air used in association with the second die outlet is typically only operated or operated at a significant level to move the second plastic envelope outwardly and into contact with the pipe cuff cavity of the mold blocks. During the forming of corrugated pipe with the smooth inner wall, this air is typically cut off or not provided to any substantial extent.

Figure 8:
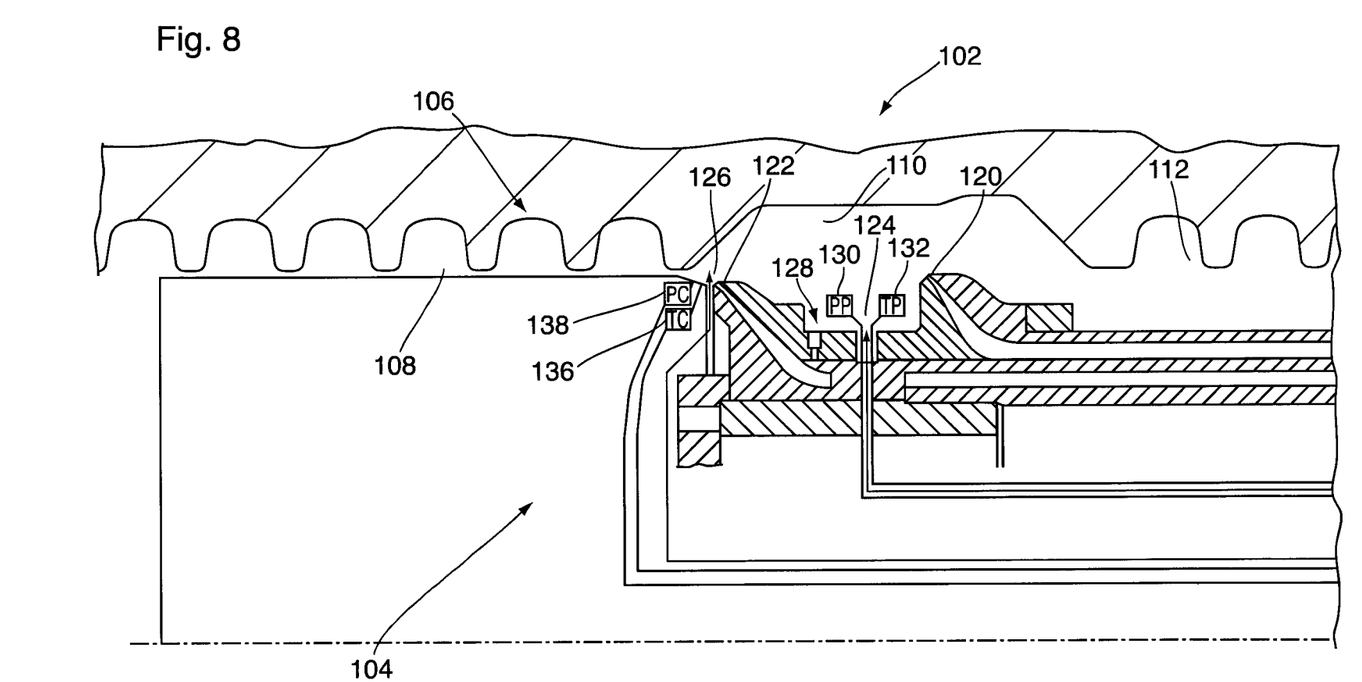
FIG. 8 is a modified sectional view of a preferred embodiment that includes additional temperature sensors allowing improved control of the extrusion process.

FIG. 8 shows a modified corrugator 102 that in addition to sensing of the pressure adjacent the extrusion outlets also advantageously senses temperature at the extrusion outlets. With this arrangement more information with respect to the extrusion process at the extrusion outlets is known and the operator can use this information for better control of the extrusion process.

For example, the smooth inner wall bridges across adjacent corrugations of the outer wall and forms sealed cavities filled with air between corrugations. The air is at the pressure measured by pressure transducer 130. When the pipe cools the smooth inner wall may deform into the cavity between corrugations due to a reduced pressure caused by cooling. These cavities at the time of forming relative to the cooled cavity after manufacture have the general relationship $$\frac{P_1 V_1}{T_1} = \frac{P_2 V_2}{T_2}$$

The difference between $T_1$ and $T_2$ is typically in excess of 100° C. It is desired for $V_1$ to approximately equal $V_2$ to maintain the straight smooth wall, however if $P_2$ is too low, $V_2$ may decrease by inward buckling into the cavity. By appropriate control of $P_1$ inward buckling can be reduced or avoided. It is preferable to automatically adjust pressure based on the sensed conditions. It is also possible to have the operator adjust $P_1$ based on the pipe being produced. Operator adjustment is also an effective approach as plastic material, extruder operating conditions and other factors can affect this relationship. Monitoring the temperature allows the operator further information and for example may increase cooling if the sensed temperature is too high.

Figure 9:
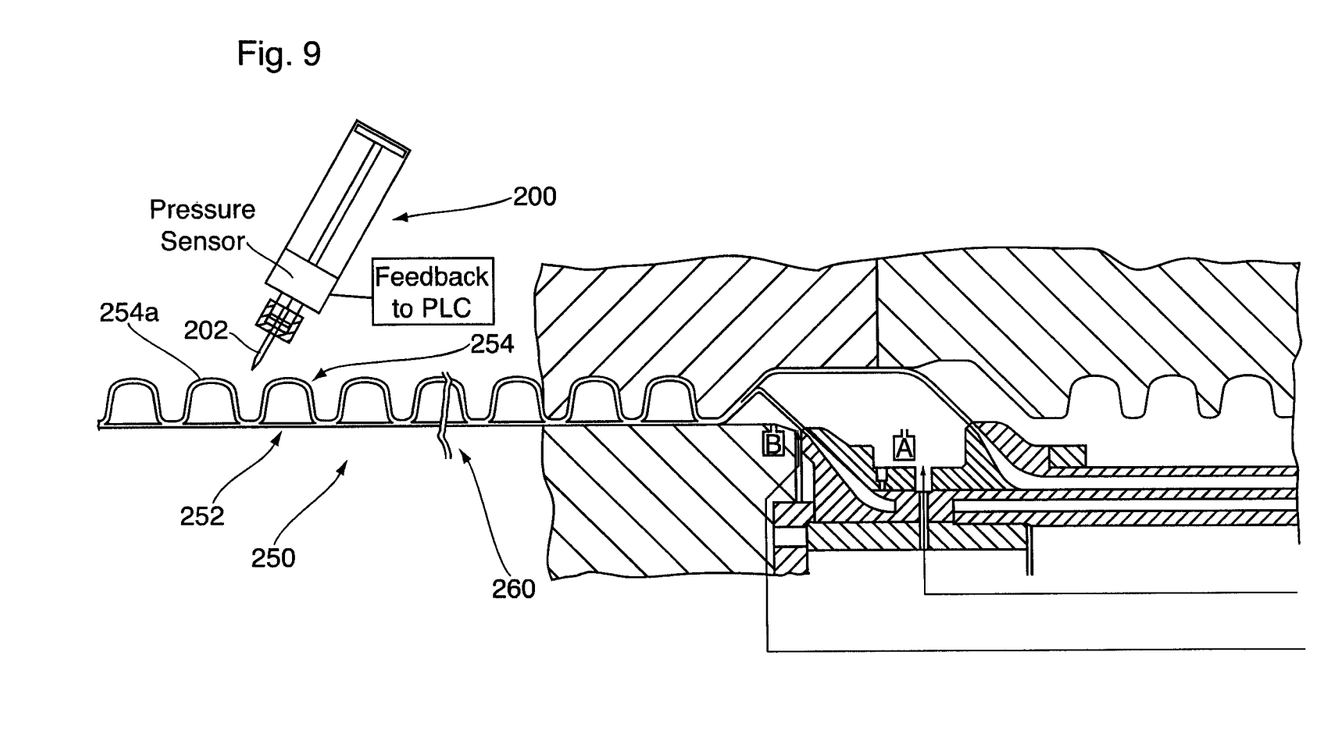
FIG. 9 is a further modified arrangement that includes downstream sampling of temperature and pressure in formed corrugations.

FIG. 9 shows a further embodiment where one wall of a double wall corrugated pipe 250 is shown having a smooth inner wall 252 and outer corrugated wall 254. The inner wall 252 is preferably of a generally constant internal diameter to provide a smooth flow through the pipe and reinforce the corrugations. One of the sealed corrugations 254a is about to be sampled by a device 200 with respect to temperature and pressure substantially downstream of the die tooling. The cut line 260 indicates a substantial gap. In this way some cooling has already occurred and the temperature and pressure will have changed. This measured information can be provided to the automated program and depending on the information adjustment of the die tooling (pressure, temperature, etc.) may be required. Resealing of the sampled corrugation can also be completed. It is preferable that both temperature and pressure be sampled and this information provided to an automated program controlling the extrusion process.

Downstream sampling of corrugation temperature and pressure is programmed at certain intervals to push the hollow needle 202 into a corrugation. Pressure and temperature are measured as previously indicated.

One suitable location to measure the air pressure with respect to polyethylene or polypropylene double wall corrugated pipe is downstream of the pipe after cooler.

This control and adjustment of pressure based on sensed temperature and/or other factors is used to provide a smooth inner wall to the double walled pipe of a generally consistent internal diameter. As an alternative to temperature and pressure sampling the internal diameter may be measured either continuously or intermittently and this information provided to the automatic control. If the internal diameter deforms inwardly into the pipe too much pressure is present whereas deformation outwardly indicates too little pressure at the time the corrugation is sealed.

Figure 10:
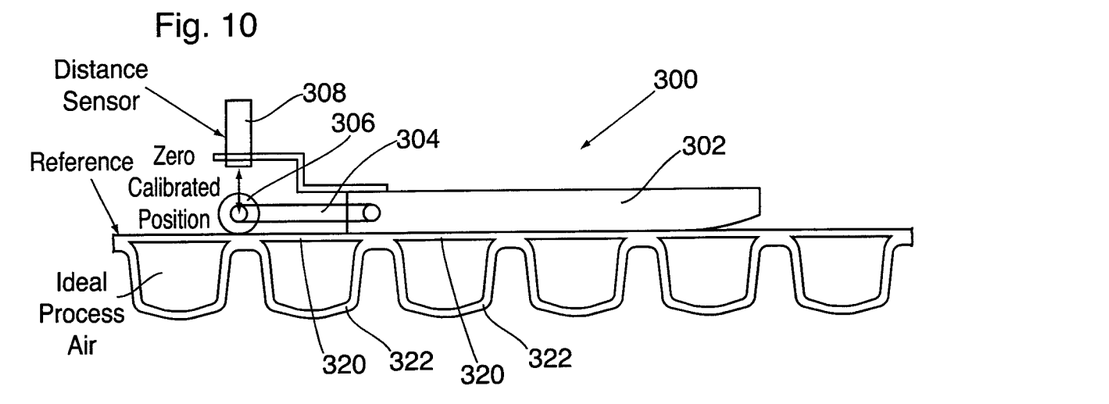
FIG. 10 is a partial sectional view through a portion of double wall corrugated pipe having a mechanical sensor for measuring repeating distortions (if present) in an inner wall caused by incorrect pressure at extrusion of the corrugations.
Figure 11:
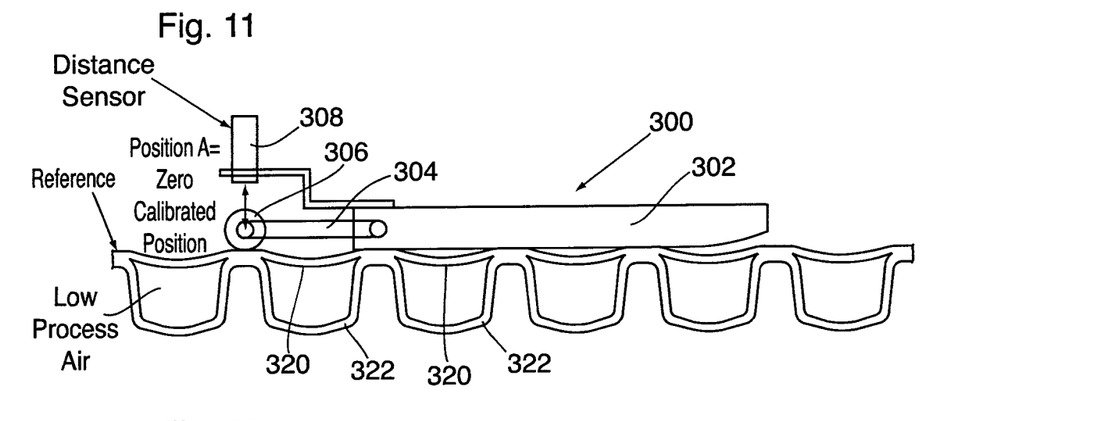
FIGS. 11 and 12 are similar to FIG. 10 where the mechanical sensor moves and detects low pressure distortions of the inner wall.
Figure 12:
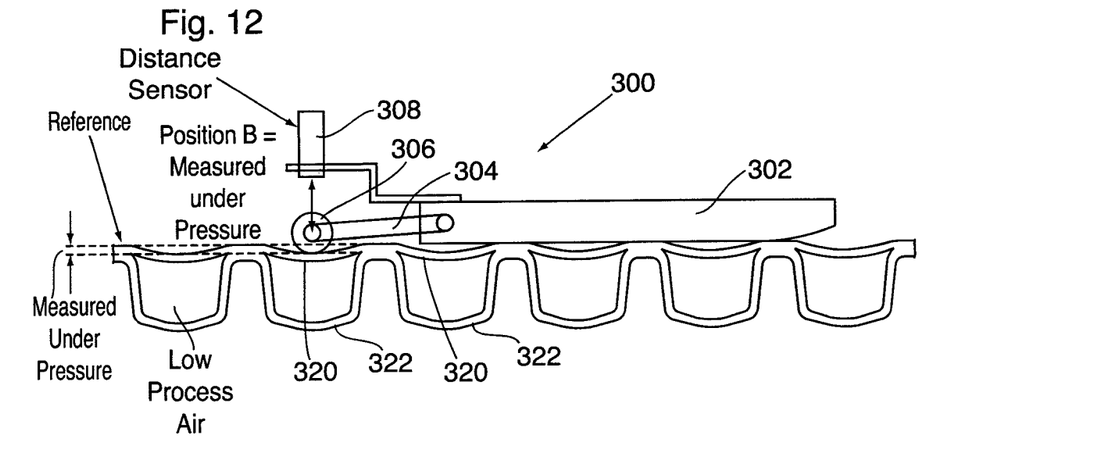

A device 300 for sensing the linearity of the inner wall of a double wall corrugated pipe is shown in FIGS. 10 through 12. The sensing device 300 is located after the cooling plug and typically the structural member 302 will be attached to or associated with the trailing edge of the cooling plug or other upstream structure. At the end of the structural member 302 is a lever finger 304 having a roller 306 pivotally secured to the finger and lightly biased against the inner wall of the corrugated pipe. This roller will follow any changes in the internal shape of the inner wall and in particular senses any deformation of the inner wall that spans each corrugation. The position of the roller 306 relative to the distance sensor 308 is tracked and processed.

In FIG. 10 it can be seen that an ideal pressure has been achieved at the die outlets (time of sealing of the corrugations) as the inner wall 320 that spans the various corrugations 322 is linear. With this arrangement the roller 306 essentially stays at the same distance from the distance sensor 308 (a zero calibration point).

In FIGS. 11 and 12 the inner wall of the double wall extruded pipe has been pulled into the individual corrugations 322 due to low pressure. In FIG. 11 the roller 306 is in a zero or neutral position as the roller is contacting the joined inner and outer wall between corrugations. The thickness of these two walls and the position thereof does not appreciably vary as it is primarily determined by the die tooling and corrugator.

In FIG. 12 the double wall extruded pipe has moved and the roller 306 is now centered in the distorted inner wall 320. The distance between the roller 306 and the distance sensor 308 has increased and thus the amount of distortion of the inner wall is accurately tracked.

The type of distortion shown in FIGS. 11 and 12 is caused by low pressure at the time of extrusion and measuring this distortion by a sensing arrangement provides a feedback signal preferably used to automatically adjust the air pressure in the cavity of the die tooling. As can be appreciated, each corrugation is assessed by this sensing device and variations in the sensed movement (i.e. the position of the roller 306 relative to the distance sensor 308) will repeat and an average maximum distortion signal can be used particularly for air pressure adjustment.

The sensing arrangement of FIGS. 10 through 12 provides an alternate arrangement to downstream pressure and temperature sensing. The alternate embodiment measures the linearity of the inner wall and the extent of any deformation. Deformation caused by low pressure as shown in FIGS. 11 and 12 and deformation caused by excessive air pressure in the corrugations are determined and appropriate automatic adjustments can be made.

The mechanical sensing arrangement 300 provides an alternative to downstream sampling or the operator merely making a visual assessment of the condition of the inner wall after the pipe is cut into sections. The mechanical sensing of the condition of the inner wall and/or the pressure and temperature sensing by sampling downstream provide a feedback signal used to automatically adjust the air pressure to maintain a consistent inner wall as generally shown in FIG. 10. Other arrangements for sensing the linearity of inner wall can also be used.

For PVC pipes the air pressure preferably is sampled approximately at a midpoint between the corrugator and the pipe cut off device that cuts the formed pipe into discrete lengths.

As in the earlier figures, the corrugator 102 includes die tooling 104 and has schematically illustrated a moving mold tunnel 106. The moving mold tunnel includes a corrugated portion 108, a coupling portion 110 and a following corrugated portion 112. The extruded plastic forming the pipe has been omitted for greater clarity. During the molding of a pipe coupling when the pipe coupling portion 110 is moving past the first extrusion outlet 120, accurate control of the pressure is desirable to urge the plastic extruding out of outlet 120 to move against the outer wall of the moving mold tunnel. As can be seen, a pressure port 124 is provided downstream of the extrusion outlet 120 and this port is connected to a regulated pressure source that can be adjusted depending upon what portion of the moving mold tunnel is passing the extrusion outlet 120 and can also be adjusted to modify the extrusion process in accordance with sensed conditions or results.

The modified corrugator 102 also preferably includes the additional temperature sensor 136 that provides a measurement of the temperature of the plastic being extruded through the extrusion outlet 122. Again, for the reasons discussed in association with the other figures, a pressure sensor 138 is also valuable for sensing the pressure immediately downstream of the extrusion outlet 122.

Knowledge of the sensed air temperature by temperature sensor 132 in what has previously been referred to as cavity A provides information with respect to the temperature and the pressure of the air that will be effectively sealed between the inner wall of the pipe and the outer wall of the pipe with respect to each corrugation. Each corrugation is effectively sealed by the plastic being extruded through the extrusion outlet 122 as it contacts the inner portion of the corrugations. This trapped air is locked in each corrugation once the inner wall has been secured to the outer wall. As the double wall corrugated pipe starts to cool down the volume of air within each corrugation remains the same (unless distortion occurs) however the temperature and pressure within the sealed corrugation thereof continue to decrease. The reduction in pressure can cause the inner wall to deform inwardly and thereby reduce the volume to partially compensate for the reduced pressure that otherwise would occur within the corrugation. This inward distortion of the inner wall causes the inner wall of the pipe to have a wavy or distorted surface and it is difficult to maintain a straight inner liner face (generally consistent internal diameter) which is the intended result.

With the knowledge of the internal volume of the corrugation, the temperature of the air and pressure of the air when the corrugation volume is effectively sealed, it is possible to reduce any unwanted inward distortion of the inner wall.

With respect to the sensing of pressure and temperature adjacent the inner wall extrusion outlet 122, a different area of control is addressed. The temperature of the extruded plastic can significantly affect the fusion of the inner wall to the opposed portions of the corrugated wall. Thus the fusion of the inner and the outer wall can be assessed by monitoring the air temperature as plastic is extruded through the extrusion outlet 122. This preferred extrusion temperature can be from about 210° C. down to about 150° C. depending upon the type of plastic being extruded and the particular conditions of the extruder.

It is also desirable to include an ability to heat the die tooling adjacent the outlet 122 for example by circulating hot air through the die tooling or by providing a separate heat arrangement which can be electrically controlled to maintain a desired heat temperature. The sensing of both pressure and temperature generally associated with the extrusion outlet 120 and the extrusion outlet 122 allows the operator to understand the actual operating conditions of the extruder and make appropriate adjustments to achieve the desired quality and consistency of the extruded plastic pipe.

Sensing of these temperatures and pressures allows an automated program or an operator to respond to actual extruding conditions and appropriately modify the extrusion process in an efficient manner.

Although various preferred embodiments of the present invention have been described herein in detail, it will be appreciated by those skilled in the art, that variations may be made thereto without departing from the appended claims.

The embodiments of the invention in which an exclusive property or privilege is claimed are defined as follows:

1. A pipe corrugator and associated die tooling for forming pipe having elongate pipe sections separated by integral connecting cuffs provided at predetermined locations in the length of the formed pipe, said pipe corrugator comprising two opposed series of circulating mold blocks that abut to form an inlet to a mold tunnel and remain in abutment until an exit to the mold tunnel where the mold blocks separate and are returned to said inlet;
   each series of mold blocks including first mold blocks for forming said elongate pipe sections in said mold tunnel and second mold blocks for forming in said mold tunnel said connecting cuffs;
   said die tooling comprising a die tool body having two die outlets located in said mold tunnel adjacent said inlet with said die outlets separated by a process air cavity formed in a recessed portion of an exterior wall of said die tool body open to said mold tunnel and connected to a first process air supply providing air under pressure to a first process air outlet located in said process air cavity, a first air pressure transducer located in said process air cavity detecting air pressure in said process air cavity, a second supply of process air supplying process air to a second process air outlet located immediately downstream of said second die outlet; and
   a controller receiving a signal of the air pressure sensed by said first air pressure transducer and based thereon providing process air at a first air pressure to said first process air outlet appropriate for forming corrugations when said first mold blocks pass over said first and second die outlets and said controller controls said first process air supply and selectively operates said second process air supply to provide process air at a second air pressure or a cuff forming pressure that are reduced relative to said first air pressure for forming a cuff portion when the cuff cavity of said second mold blocks pass over said die outlets.

2. The pipe corrugator as claimed in claim 1 including a first temperature sensor immediately associated with said first air pressure transducer and located in said process air cavity; and
   said controller receives a temperature signal from said first temperature sensor and uses the temperature signal as part of an extrusion process control.

3. The pipe corrugator as claimed in claim 1 or 2 including said controller receiving positional information of said second mold blocks relative to said die outlets;
   said controller based on said positional information of said second mold blocks determining when a leading wall of the pipe cuff cavity is about to move past said first die outlet and reducing the pressure of said air process cavity to said second air pressure;
   said controller based on said positional information determining when said leading wall of the pipe cuff cavity is about to move past said second die outlet and providing air pressure to said second process air outlet at said cuff forming pressure that is generally equal to said second air pressure via said second air supply; and maintaining said air pressure at said cuff forming pressure and said second air pressure until a trailing wall of said pipe cuff cavity passes said second die outlet and then returning to said first air pressure in said process air cavity and removing air supply pressure through said second process air outlet.

4. The pipe corrugator as claimed in claim 3, wherein said second process air outlet connects with a second process air supply conduit extending in a length of said die tooling and supplying regulated process air under pressure to said second process air outlet immediately downstream of said second die outlet and controlled by said controller using a pressure transducer adjacent said second die outlet detecting an air pressure to the exterior of the die tooling at said second process air outlet.

5. The pipe corrugator as claimed in claim 4 including a temperature sensor measuring temperature at said second process air outlet providing a second temperature signal to said controller for maintaining fusing temperature at said second die outlet.

6. Die tooling for use in forming double wall corrugated pipe comprising:
   a die tool body having a first die outlet and a second die outlet located downstream of and separated from said first die outlet by an air processing cavity located in a recess of said die tooling and opening outwardly; said first and second die outlets being connected through the die tool body to extruded plastic inlets;
   a first process air outlet located in said air processing cavity, said first process air outlet connecting with a first process air supply conduit extending in a length of said die tooling and supplying process air under pressure to said first process air outlet;
   an air pressure transducer located in said air processing cavity and producing an air pressure signal in accordance with the air pressure of a variable chamber defined between the die tooling including the air processing cavity and plastic extruding through said die outlets and connecting with each other;
   a controller at a position upstream of said first and second die outlets, said controller configured to receive said air pressure signal; and a regulated air supply controlled by said controller and connected to said first process air supply conduit to regulate the air pressure of said variable chamber between at least a corrugation forming pressure and a lower cuff forming pressure.

7. Die tooling as claimed in claim 6, wherein said air processing cavity further includes a temperature sensor used by said air controller to adjust the extrusion process and said air pressure transducer is spaced from said first process air outlet.

8. Die tooling as claimed in claim 6 further comprising a second process air outlet located immediately downstream of said second die outlet and connecting with a second process air supply conduit extending in the length of said die tooling and supplying regulated process air under pressure to said second process air outlet immediately downstream of said second annular die outlet and controlled by said controller using a pressure transducer adjacent said second annular die outlet detecting an air pressure to the exterior of the die tooling at said second process air outlet.

9. Die tooling as claimed in claim 8 further comprising a temperature sensor at said second die outlet that provides a temperature signal used to control a fusion temperature at said second die outlet.

10. Die tooling as claimed in claim 9, wherein said controller for said second process air outlet includes a minimal operating pressure used during the forming of corrugations connected to an inner smooth wall of the pipe and a higher cuff forming operating pressure for forming a single wall cuff of the pipe from plastic extruding through said die outlets.

11. Die tooling as claimed in claim 8, wherein said controller for said second process air outlet includes a minimal operating pressure used during the forming of corrugations connected to an inner smooth wall of the pipe and a higher second operating pressure for forming a single wall cuff of the pipe from plastic extruding through said die outlets and wherein said higher second operating pressure is generally the same as said lower cuff forming pressure.

12. Die tooling as claimed in claim 6, wherein said controller includes an operator adjustment for varying said corrugation forming pressure and varying said lower cuff forming pressure used to form a single wall cuff of the pipe from plastic extruding through both of said die outlets.

13. A pipe corrugator and associated die tooling for forming pipe having alternating long pipe sections separated by alternating integral connecting cuffs provided at predetermined locations in the length of the formed pipe, said pipe corrugator comprising two opposed series of circulating mold blocks that abut to form an inlet to a mold tunnel and remain in abutment until an exit to the mold tunnel where the mold blocks separate and are returned to said inlet;
each series of mold blocks including first mold blocks for forming said elongate pipe sections in said mold tunnel and second mold blocks having a cuff cavity for forming in said mold tunnel said connecting cuffs;
said die tooling comprising a die tool body having a first annular die outlet and a second annular die outlet located downstream of and separated from said first die outlet by an air processing cavity located in a recess of said die tooling and opening outwardly; said first and second annular die outlets being connected through the die tool body to extruded plastic inlets;
a first process air outlet located in said air processing cavity, said first process air outlet connecting with a first process air supply conduit extending in a length of said die tooling and supplying process air under pressure to said first process air outlet;
an air pressure transducer and temperature sensor located in said air processing cavity, said air pressure transducer producing an air pressure signal in accordance with the air pressure of a variable chamber defined between the die tooling in an area including the air processing cavity and plastic extruding through said first and second die outlets and connecting with each other;
a controller receiving said air pressure signal and a signal from said temperature sensor used to regulate an air supply; and
wherein said air supply controlled by said controller and connected to said first process air supply conduit to regulate the air pressure of said variable chamber in association with the sensed temperature.

14. The corrugator as claimed in claim 13 including a second process air outlet located immediately downstream of said second die outlet and connecting with a second process air supply conduit extending in the length of said die tooling and supplying regulated process air under pressure to said second process air outlet immediately downstream of said second annular die outlet controlled by said controller using a pressure transducer adjacent said second annular die outlet detecting an air pressure to the exterior of the die tooling at said second process air outlet.

15. The corrugator as claimed in claim 14 including said controller receiving positional information of said second mold blocks relative to said first and second die outlets;
said controller based on said positional information of said second mold blocks determining when a leading wall of the pipe cuff cavity is about to move past said first die outlet and reducing the pressure of said air processing cavity to a said second air pressure from a first air pressure;
said controller based on said positional information determining when said leading wall of the pipe cuff cavity is about to move past said second die outlet and providing air pressure to said second process air outlet at a cuff forming pressure generally equal to said second air pressure via said second air supply; and
maintaining said air pressure at said cuff forming pressure and said second air pressure until a trailing wall of said pipe cuff cavity passes said second die outlet and then returning said first air pressure in said air processing cavity and removing air supply pressure through said second process air outlet.

16. corrugator as claimed in claim 14 including a temperature sensor associated with said second annular die outlet for maintaining a desired fusion temperature.

* * * * *